United States Patent [19]
Kim et al.

[11] Patent Number: 5,273,818
[45] Date of Patent: Dec. 28, 1993

[54] EXPANDED FIBER COMPOSITE STRUCTURE HAVING A CYLINDRICAL SHAPE AND USEFUL AS A FILTER

[75] Inventors: Bang M. Kim; Donald E. Woodmansee, both of Schenectady, N.Y.

[73] Assignee: General Electric Company, Schenectady, N.Y.

[21] Appl. No.: 784,617

[22] Filed: Oct. 29, 1991

Related U.S. Application Data

[63] Continuation of Ser. No. 299,571, Jan. 19, 1989, abandoned.

[51] Int. Cl.$^5$ .................. D04H 1/58; B01D 24/00; B01D 29/085
[52] U.S. Cl. ......................... 428/288; 55/522; 55/524; 55/525; 55/527; 55/529; 210/348; 210/483; 210/497.01; 210/500.1; 210/506; 428/289; 428/290; 428/304.4; 428/317.9; 428/906
[58] Field of Search ............... 428/289, 284, 367, 286, 428/288, 312.6, 221, 116, 290, 375, 323, 34.5, 906, 304.4, 317.9; 131/230; 55/522, 524, 525, 527, 529; 210/348, 483, 497.01, 500.1, 506

[56] References Cited

U.S. PATENT DOCUMENTS

| | | | |
|---|---|---|---|
| 2,166,180 | 3/1935 | Ruben | 428/906 |
| 2,546,230 | 3/1951 | Modigliani | 428/239 |
| 2,695,855 | 11/1954 | Stephens | 428/221 |
| 3,698,023 | 10/1972 | Archbold | 428/906 |
| 4,259,092 | 3/1981 | Matsuo et al. | 428/906 |
| 4,601,937 | 7/1986 | Latussek | 428/132 |
| 4,659,412 | 4/1987 | Newman et al. | 428/86 |
| 4,670,331 | 6/1987 | Radvan et al. | 428/303 |
| 4,690,860 | 9/1987 | Radvan et al. | 428/283 |
| 4,716,072 | 12/1987 | Kim | 428/286 |
| 4,751,134 | 6/1988 | Chenoweth et al. | 428/286 |
| 4,752,527 | 6/1988 | Sanzero et al. | 428/378 |
| 4,765,915 | 8/1988 | Diehl | 210/767 |
| 4,775,580 | 10/1988 | Dighton | 428/284 |

FOREIGN PATENT DOCUMENTS

WO840230 6/1984 PCT Int'l Appl. .
2085043 4/1982 United Kingdom .

OTHER PUBLICATIONS

Plastics Technology, Dec. 1986 issue, p. 33, article titled "RP/Composites Conference Preview: Novel Materials, Additives to Debut in Cincinnati".

Primary Examiner—George F. Lesmes
Assistant Examiner—James D. Withers
Attorney, Agent, or Firm—Patrick R. Scanlon; Paul R. Webb, II

[57] ABSTRACT

An expanded fiber composite structure and process for making an expanded fiber composite structure are provided. The expanded fiber composite structure is made up of a fiber mat held in partial compression by a monolithic plastic coating on the fibers, the structure having a plurality of interstitial voids which may optionally be filled with a polymeric interstitial material. The process includes impregnating a fiber mat with a plastic material, compressing the mat to impregnate the mat with the plastic, fully wetting each fiber and creating a substantially void-free fiber/plastic matrix, and reducing the compressive forces on the mat, allowing the fibers to rebound and expand the mat to a predetermined desired thickness, in the process creating the interstitial voids. The structure is then cooled such that the plastic material stiffens and itself retains the structure at the desired thickness. The process optionally employs the addition of a molten polymeric material to the expanded or lofted mat, the material filling the interstitial voids in the structure. The composite structure may optionally be produced from a fully compressed plastic-impregnated fiber mat by heating to a temperature sufficient to loft the material and controlling the amount of lofting after the heat is applied.

4 Claims, 7 Drawing Sheets

EXPANDED FIBER COMPOSITE STRUCTURE HAVING A CYLINDRICAL SHAPE AND USEFUL AS A FILTER

This application is a continuation of application Ser. No. 07/299,571, filed Jan. 19, 1989, now abandoned.

BACKGROUND OF THE INVENTION

The present invention relates to an expanded composite structure and a process for making an expanded composite structure.

The manufacture of open-celled, lightweight plastic parts has been heretofore accomplished by one of two approaches. A first known approach involves forming the matrix of the structure by physical gas injection or the evolution of gas byproducts during a chemical reaction. A second known approach involves using a fiber mat having a desired degree of openness and dip-coating or spraying the fibers with an adhesive material, and then allowing the coating to set, giving the mat a monolithic structure.

Both of these approaches suffer from drawbacks or disadvantages in their use. The first approach requires either a physical mechanism for blowing gas into the polymer, or special use of chemicals which will evolve gas to produce the expansion. The second approach is useful essentially only for low fiber loadings in the fiber mat as the mat is coated and set in an uncompressed state.

It is an important object of the present invention to provide fiber-reinforced structures wherein the fibers are coated with a plastic material and wherein the fiber density is considerably higher than in the original fiber mat while maintaining at least a partially open-celled structure.

It is an additional object of the present invention to provide a process for manufacturing fiber-reinforced structures having interstitial voids produced by expanding a compressed, substantially void-free fiber mat under controlled conditions.

It is a further object of the present invention to provide a process for manufacturing an expanded fiber composite structure wherein a plastic impregnated mat having interstitial voids also has an additional polymeric component introduced to fill the voids.

It is a further object of the present invention to provide a product made by any of the above-identified processes comprising a reinforced composite fiber mat having a wide variety of potential commercial applications including use as thermal insulation, structural members, and filtration devices.

SUMMARY OF THE INVENTION

The above and other objects of the present invention are accomplished by providing a process for making expanded fiber composite structures and expanded fiber composite structures produced thereby. The process, in general terms, involves compressing a fiber mat and impregnating the mat with a plastic material, retaining the mat under high compression force, and while the impregnation material is still soft or molten, reducing the compression force on the mat a predetermined amount to allow the fibers in the mat to spring back, or rebound, and expand the mat thickness a desired amount, the expansion occurring due to an elastic reaction of the individual fibers in the mat. The process may be performed on discrete mat sections in a standard press using mold platens, or alternatively the process may employ a continuous feed from a roll of fiber mat material wherein the impregnation, full compression and subsequent reduced compression (mat expansion) are effected by a combination of calendar rolls and endless belt equipment.

The expanded fiber composite structure which is produced by the inventive process comprises a fiber mat impregnated with a molten plastic material wherein each fiber is coated with the plastic, the plastic forming a monolithic structure joined at the points of fiber-fiber contact, thus providing a continuous reinforcement in the structure. The structure will have a thickness less than an original thickness of the unimpregnated fiber mat, and greater than the thickness of the fully compressed, void-free impregnated mat.

The voids in the composite structure will be occupied by ambient air or gaseous products of the molten plastic in the normal course of producing the structure. Where desired, a further (third) component may be included in the structure, the component being introduced into the voids interstitially at a predetermined stage of the process. Suitable materials for a third component for various applications would include elastomers and foamed filler materials.

The expanded fiber composite structure finds many potential applications. The composite structure possesses the desirable properties of improved stiffness, increased stiffness-to-weight, toughness imparted by the plastic coating, and resistance to damage by water. As such, the composite structure may find use as a thermal insulation material in panel form for use in aircraft, or even more generally in buildings or residences.

A further anticipated application of the expanded composite structure is in filtration. The structural rigidity of the composite structure would permit use in services experiencing high fluid velocities, where structures made with more pliable fibers would be crushed or compacted. The plastic coating could further be treated to promote ion exchange with water. A further advantage to the use of the composite structure as a filtration device would be that the filter supports and the filter housing could be made integrally with the filter media, thereby eliminating costly assembly steps.

The composite structure, when interstitially filled with a third component, also may find several applications. Filling the voids of the structure with an elastomeric or semi-elastomeric material will permit use of the product in cantilever and coiled spring applications. An insulative composite structure may also be provided which is interstitially filled with a low density foamed filler, such as polyurethane, for insulation, the structure further having an outer coating of polyethylene to serve as as moisture barrier.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments of the present invention taken in conjunction with the accompanying drawings wherein like reference characters represent like parts throughout the several views, and wherein.

DETAILED DESCRIPTION OF THE INVENTION

Referring now to the drawings wherein like numerals indicate like elements throughout, the process for making an expanded fiber composite structure will be described initially by reference to FIGS. 1a-c. This sequence of Figures depicts in schematic form the basic steps for producing an open-celled, fiber reinforced composite structure according to the present invention.

Figure 1A:
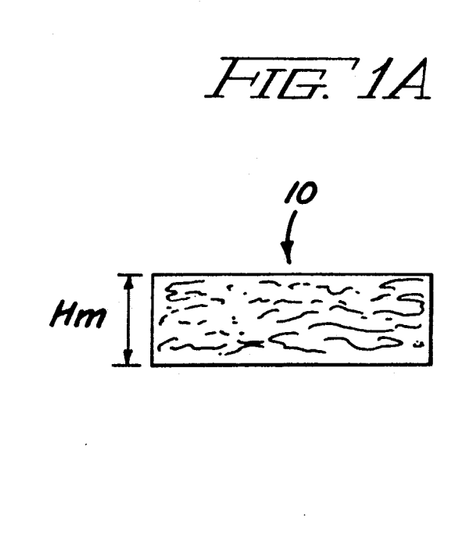
FIGS. 1a, 1b, and 1c depict, in substantially schematic form, the steps involved in performing the process for making an expanded fiber composite structure in accordance with the present invention.

FIG. 1a represents an unimpregnated fiber mat 10, having an initial height (or thickness) $H_m$, which is itself produced by methods well known in the art. In FIG. 1b, a void-free, fully impregnated composite structure 12 is formed by adding an impregnating material such as a plastic or resin, and by applying compression and heat using one of several standard impregnation techniques known in the art, a high compression force being supplied in this instance by a pair of mold platens 15 and 16. The high compression force holds structure 12 at a height $H_{vf}$ (void-free). The compression and heat applied in this process ensure full impregnation of the plastic in the mat, and complete wetting of the fibers with the molten plastic.

At height $H_{vf}$, the fibers and the fiber mat possess stored elastic or spring back energy tending to urge the mat to expand and regain its original thickness. The impregnating plastic, if allowed to cool and set, will substantially prohibit any expansion of the mat. Thus, in the process according to the present invention, the compressive forces holding the impregnated mat 12 at height $H_{vf}$ are reduced while the plastic is still in a molten or softened state. The reduction of compressive forces is shown in FIG. 1c, wherein platens 15 and 16 are moved farther apart, thereby allowing the impregnated mat 12 to spring back or expand a predetermined amount, to a final thickness $H_f$. The process further includes holding the platens at this distance until the plastic cools and sets, thereby freezing the height of the impregnated mat 12 and forming an expanded fiber composite structure 14.

It should be recognized that, in the process for producing the expanded fiber composite structure described above, the process may be modified slightly wherein the impregnated mat 12 is allowed to cool and set in its compressed, void-free state, and later heated to resoften or remelt the plastic or resin. At that time, the mat will exert spring-back forces, and expand to a desired predetermined height. The expanding of the impregnated mat will herein alternatively be referred to as "lofting" the mat.

Figure 1B:
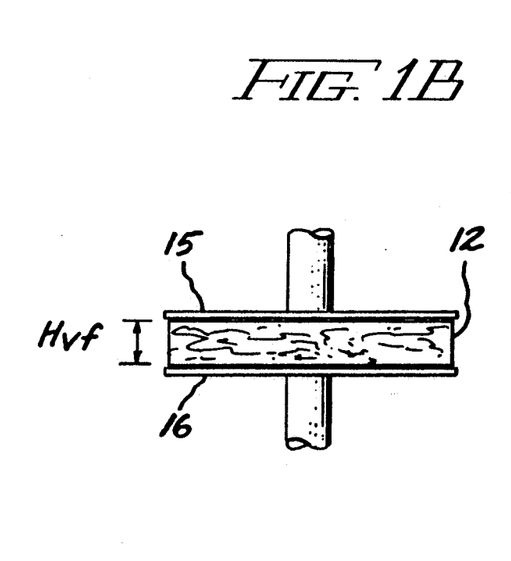
Figure 1C:
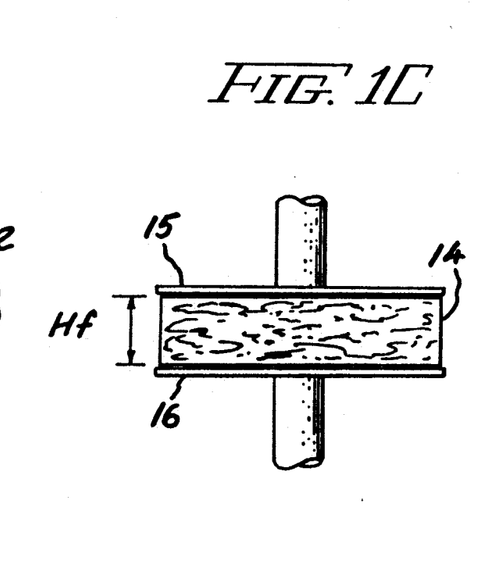
Figure 2:
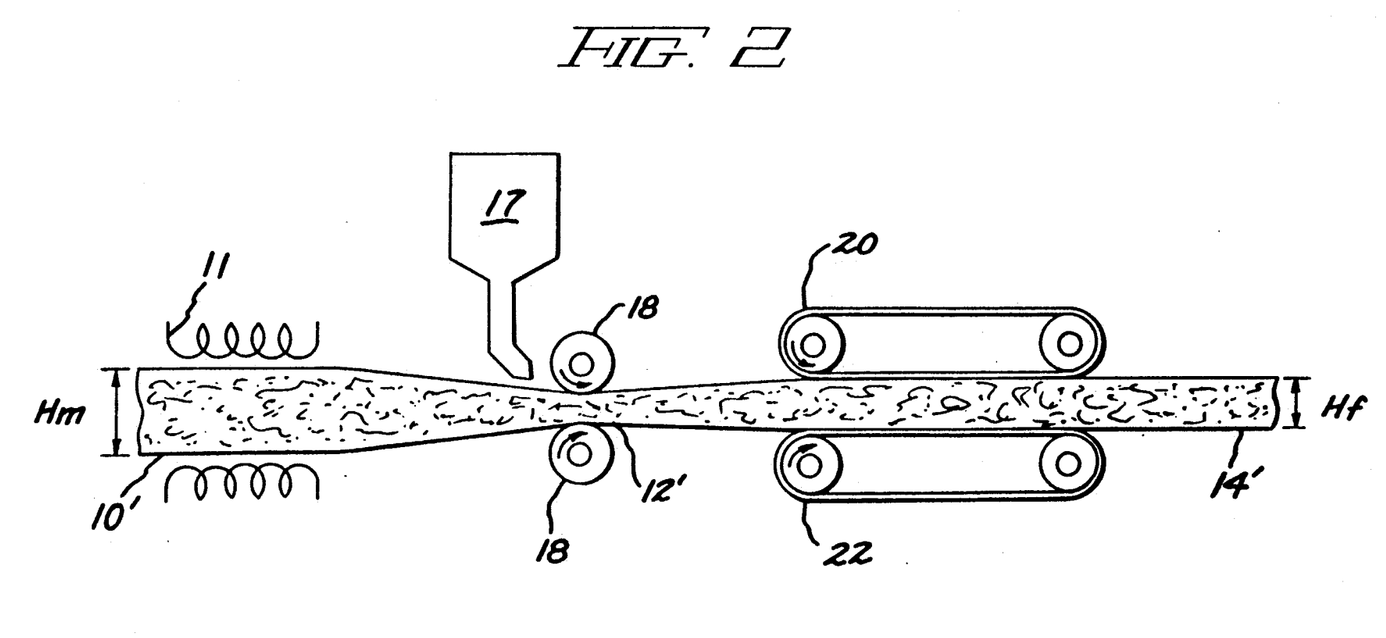
FIG. 2 depicts, in diagrammatic form, an apparatus for performing the process of the present invention in producing the expanded fiber composite structure continuously from a roll of fiber mat.

In addition to process described with reference to FIGS 1a-c, which would be primarily used for producing discrete composite structures 14, FIG. 2 depicts, in diagrammatic form, an alternate apparatus which could be employed in producing a continuous sheet of expanded fiber composite. In this Figure, fiber mat 10' is of a continuous sheet form and may be taken from a roll (not shown) of mat material. The glass fiber mat is preheated by heating elements 11 to facilitate wetting of fibers with resins. The impregnation material is introduced onto the mat by an extruder 17, or other appropriate means for handling and distributing a molten plastic, and the mat 10' is then compressed with an initial compression force between calendar rolls 18, to produce a fully impregnated substantially void-free mat 12'.

After passing between calendar rolls 18, mat 12' is allowed to spring back under reduced compressive force to a height governed by a pair of restrained endless belts 20 and 22 disposed on opposite sides of the mat at a predetermined desired spacing. Belts 20 and 22 are either cooled or are sufficiently long that the plastic will be cooled and set by the time the mat 12' emerges from a distal end of the belts as an expanded fiber composite structure 14' having a final height $H_f$ which is less than the original mat height $H_m$, but greater than the height $H_{vf}$ of the fully compressed mat at the calendar rolls.

Figure 3:
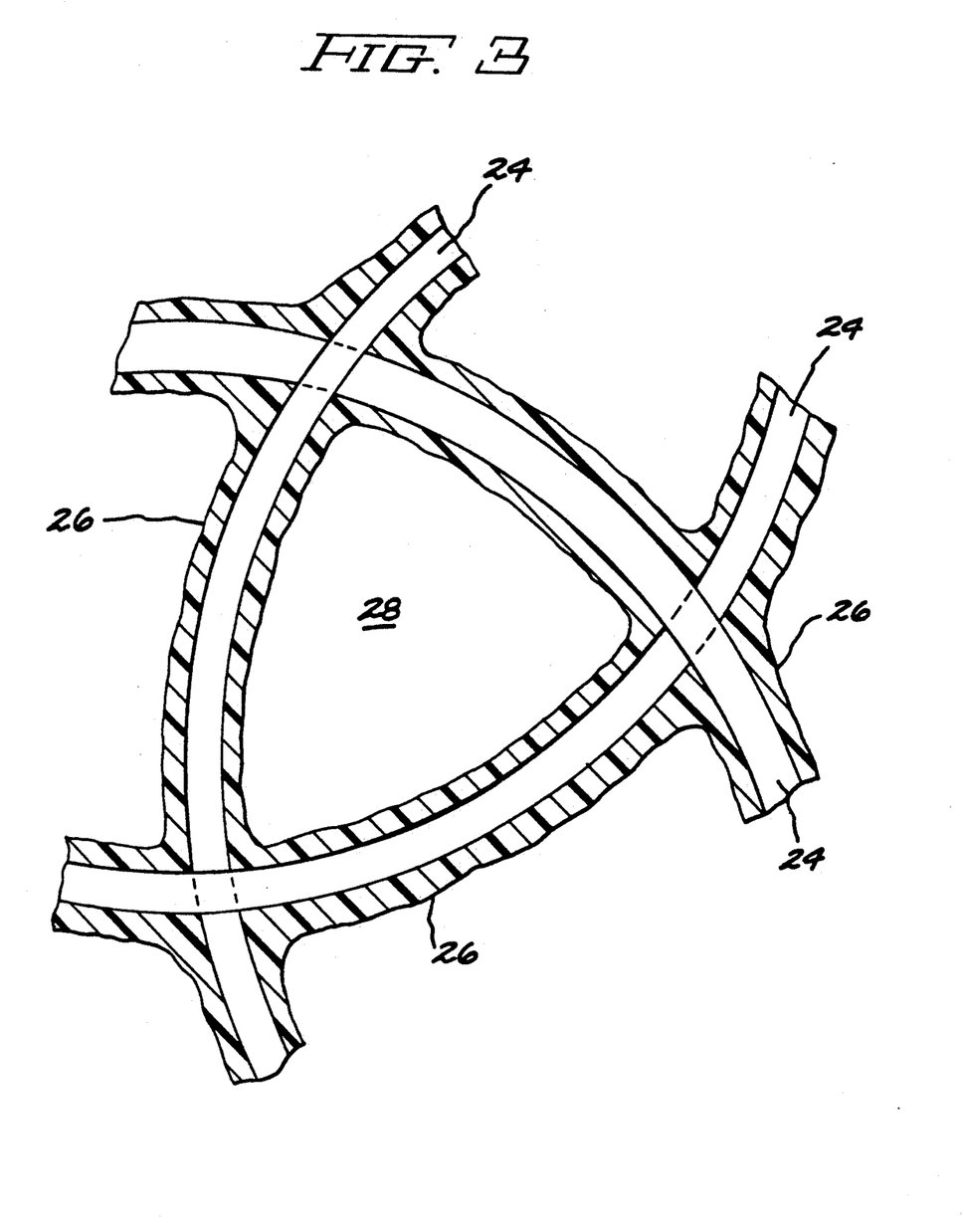
FIG. 3 is an exploded, partial cross-section view of the coated fibers in the composite structure of the present invention.

FIG. 3 depicts an exploded, partially cross-sectional view of portions of several fibers making up the expanded fiber composite material of the present invention. When the mat is expanded from the fully compressed, void-free state, the individual fibers 24 return to a less densely packed matrix, and as depicted in FIG. 3, the plastic impregnating material 26 clings to the fibers as a coating, and interstitial voids 28 are created in the expanded composite structure. It can also best be seen in this Figure that the plastic coating 26 on the fibers 24 will form a continuous, three dimensional monolithic structure, formed around the individual monolithic structure, formed around the individual fibers in the composite structure.

While the expanded fiber composite structures 14 and 14' thus produced will have desirable physical properties for various applications, additional processing steps may be employed in instances where the structures are to be used in specific applications. The additional processing according to the present invention may take several forms.

As previously noted, the expanded fiber composite structure shows commercial potential in filtration devices, for both liquids and gases. The basic composite structure (FIGS. 1c, 2) could be used as a filter media, as the voids created in the lofting process render the structure porous. The degree of porosity of the structure may be controlled in producing expanded fiber composite structures for use as filters, as the porosity is dependent not only on the amount of lofting of the structure, but on the types and sizes of fibers employed in the mat, as well as the amount of plastic or resin used to bind the fibers together structurally.

Figure 4A:
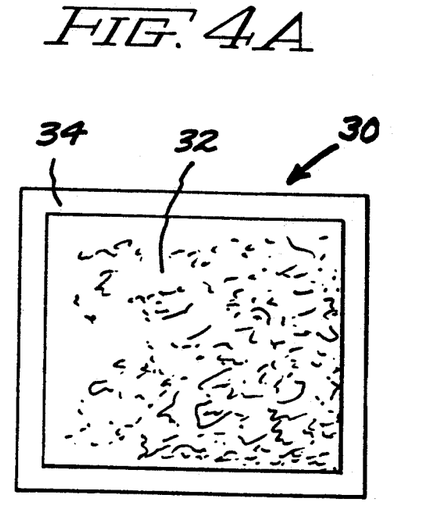
FIGS. 4a and 4b are front and side elevation views of the expanded fiber composite structure designed for use as an air filter.
Figure 4B:
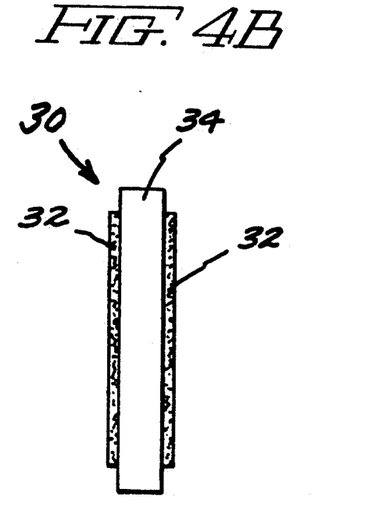
Figure 5:
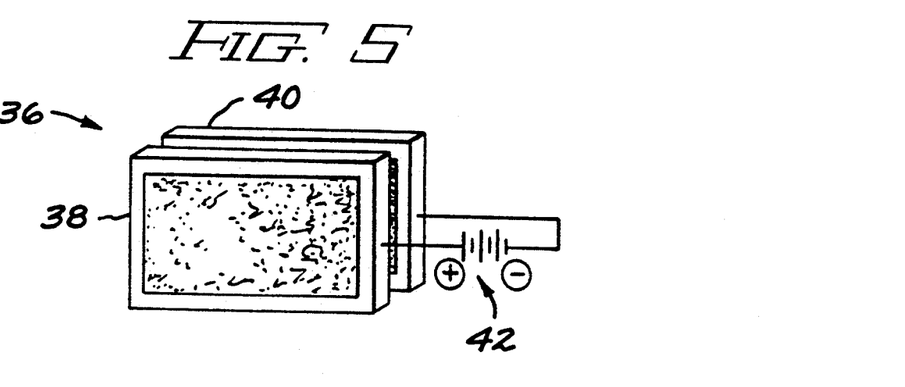
FIG. 5 is a perspective view of a pair of expanded fiber composite structures adapted for use in a charged air filter.
Figure 6:
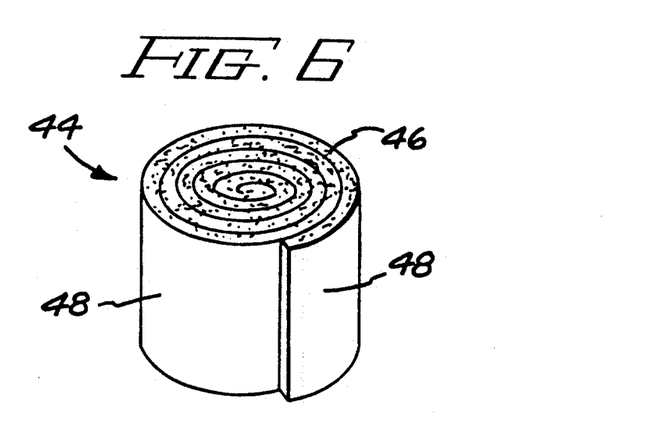
FIG. 6 is a top perspective view of a liquid filter comprising an expanded fiber composite sheet.

FIGS. 4, 5 and 6 depict three embodiments of the expanded fiber composite structure of the present invention for use as filtration devices. The processing steps taking place subsequent to the initial lofting involved in making these embodiments will be discussed as well.

FIGS. 4a and 4b show a basic air filter 30 in which an expanded fiber composite structure comprising glass fibers and thermoplastic fiber coating is employed. As shown, the filter has a porous center portion 32 created during the lofting of the structure, and an integral housing 34 at its periphery. The housing 34 is formed or molded from the expanded porous structure using a hot surface molding process such as that described in U.S. Pat. No. 5,047,198 entitled "Compression Molding of Composite Parts on Hot Mold Surfaces with a Short Cycle Time", and assigned to the assignee of the present invention. That application is hereby incorporated by reference. The hot surface molding process is employed to reclose the pores around the perimeter through the use of heat and pressure. The filter may thus be made in an oven or a mold having in-mold heating capability, wherein previously unlofted sheet is lofted and the hot surface molding of the housing is performed immediately thereafter. As can be seen in FIG. 4a, the perimeter of the composite structure which is molded to form housing 34 may have a thickness slightly less than that of the remainder of the structure as a result of the hot surface molding process.

In addition to making a filter having such an integral housing, this process involving lofting of the structure and subsequent hot surface molding may also be used to produce flow passages which are impervious to the liquid or gas flow, as well as for forming connectors or fixtures out of the same integral piece of stock material. Thus several assembly steps required in manufacturing conventional filters, wherein these components are manufactured individually and subsequently assembled, can be eliminated in producing filters according to the present invention.

A variation on the process discussed above for making filtration media is also contemplated. In this process the stock material from which the filter 30 is made begins in a state wherein the fibers have been impregnated, and the material has been cooled and set under the impregnation pressure, i.e., the plastic-impregnated sheet is "unlofted". In this process, only the areas which are desired to perform filtration are subsequently heated and expanded by using a form of local heating. This localized heating may be effected by insulating the regions where no expansion is to be effected, and heaters having structure in a convection oven. Other techniques may be employed, such as using radio frequency (RF) heating with special antennas for local dosing, or by using activator chemicals which are sensitive to RF in the portions of the sheet stock where lofting is desired.

FIG. 5 depicts an additional embodiment of an air filter employing an expanded fiber composite structure according to the present invention. In this embodiment, a charge air filter 36 is provided wherein the expanded fiber composite structure comprises steel or other conductive metal fibers impregnated with a thermoplastic material. The charged air filter 36 employs a pair of the composite structures as filter media 38 and 40, which may be produced by any of the above-mentioned processes. In this filter, a potential is applied across the filter media 38 and 40 as depicted schematically in FIG. 5, wherein a battery 42 is in electrical contact with the conductive metal fibers of the filter media. In this structure, the plastic coating of the steel fibers protects the steel fibers and the filter media possesses sufficient strength and rigidity to be self-supporting, no housing or other supports thus being required.

FIG. 6 depicts an embodiment of the composite structure of the present invention which is designed for use as a liquid filter 44. This configuration comprises a coiled sheet 46 of the composite structure, and is manufactured to filter liquids passing through in a top-to-bottom (or bottom-to-top) direction, as viewed in FIG. 6. A process for manufacturing this filter 44 may advantageously begin with coiling an "unlofted" sheet of impregnated fiber composite material into a loose spiral wherein the sheet material has room between spiral layers to loft or expand. This may be facilitated by heating the unlofted sheet at a low temperature to impart more flexibility to the sheet 46. Then, within a cylindrical mold, the sheet 46 may be brought to a temperature sufficient to soften the plastic and to loft or expand the structure, and the sheet 46 will expand in thickness to fill the cylinder, creating a substantially continuous filtration volume as the sheet expands to fill the gaps present in the loosely wound coil. Further, the outer surface 48 of the filter 44 may advantageously be mold sealed as it expands into contact with the mold surface, by keeping the mold surface at a sufficient temperature to effect a hot surface molding as previously described, thereby closing the pores of the material around the circumference.

FIGS. 7-12 are included to facilitate the description of various processes for producing a further embodiment of the expanded fiber composite structure of the present invention. This further embodiment comprises a fiber mat, such as that shown at 10 in FIG. 1, which is impregnated with a plastic or resin and formed into an expanded fiber composite structure containing a plurality of voids therein. The structure further comprises a third component (the fibers and the impregnation material being the first and second), the third component, preferably a polymeric material, being introduced interstitially to fill the voids in the structure. In this embodiment, the final structure is no longer porous, however the inclusion of the third component imparts other desirable properties to the structure. The processes for making the composite structure will first be discussed, and examples of envisioned materials and potential uses for the structure will follow.

Figure 7:
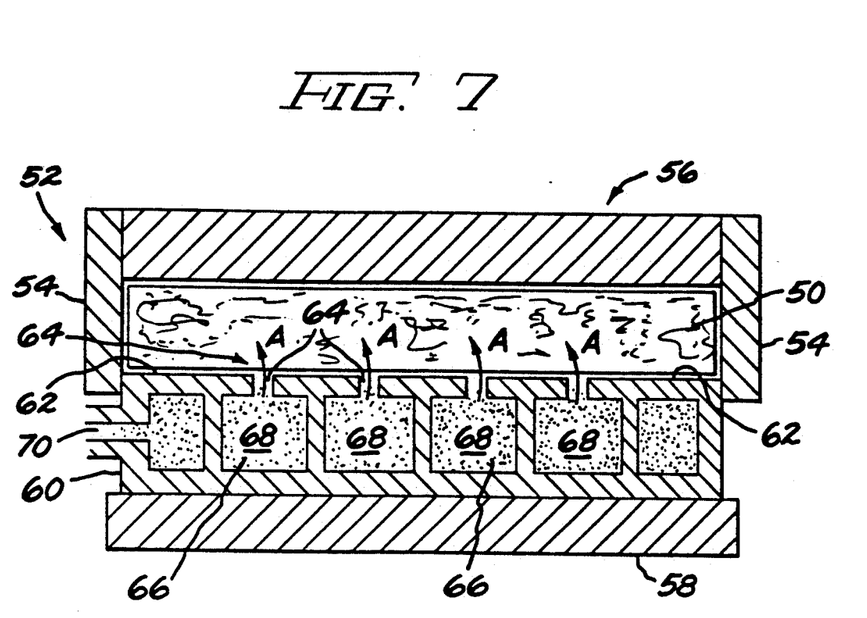
FIG. 7 is a side cross-sectional view of a mold for making a three-component expanded fiber composite structure.
Figure 8:
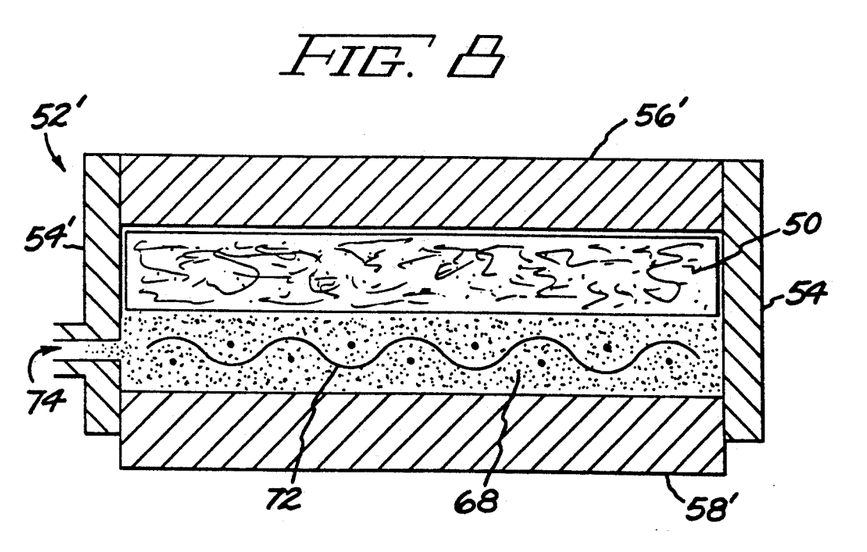
FIG. 8 is a side cross-sectional view of a mold for making a three-component expanded fiber composite structure.

FIGS. 7 and 8 depict, in partially schematic cross-sectional views, two variations of a mold which may be used in conjunction with a process for producing a three component expanded fiber composite structure 50. Mold 52 in FIG. 7 has sidewalls 54, upper platen or die 56, and lower platen or die 58.

Mold 52 is used initially to produce a fully compressed, void-free fiber mat impregnated with plastic, such as that illustrated in FIG. 1b as numeral 12. As in the process described with respect to FIG. 1, the upper and lower platens 56 and 58 which provide the compressive force are moved farther apart to permit the fibers in the mat to expand. Lower platen 58 is provided with a runner platen 60 which forms the die face 62, the die face having a plurality of holes 64 spaced across the length and width of the runner platen 60. These holes are sufficiently small that the mat fibers will not be pressed into the holes to an extent where the holes would become clogged, while at the same time are large enough to permit the interstitial material to flow therethrough. Runner platen 60 further has cavities or channels 66 extending through an interior thereof which are adapted to receive the interstitial material 68 in a flowable molten state from inlet means 70, and to distribute the material to the plurality of holes 64.

When the platens 56 and 58 are separated to the predetermined desired final thickness, the interstitial material 68 will flow into the voids as the impregnated mat expands to fill the volume between the platens as indicated by arrows A. The combination of supplying the interstitial material 68 under pressure, and the reduced pressure in the mold allowing the mat to expand, will enable the interstitial material 68 to substantially completely fill the voids in the expanded fiber composite structure. A further processing step, when using a mold 52 of this type having a runner platen 60 for injecting an interstitial material, may be employed to facilitate removal of the finished product 50 from the mold. A final heating burst may be applied to the runner platen 60 to soften the interstitial material 68 near the holes 64 to facilitate separation of the product 50 from the die face 62.

FIG. 8 employs much the same processing sequence, but in place of runner platen 60, mold 52, is provided with a thick screen 72 inside the mold adjacent to lower platen 58' extending between sidewalls 54'. In this substantially schematic embodiment, the inlet means 74 for introducing the impregnation material is disposed extending through the sidewall 54' at the same level or slightly below where the screen 72 is located inside the mold.

The interstitial material 68 is injected under pressure preferably at substantially the same level as the screen 72, which acts to distribute the material into the expanded fiber mat once the mat has begun to expand. In this embodiment, the screen 72 itself, which will be fully wetted by the interstitial material, could become part of the finished product, or heat could be applied to facilitate removal of the screen 72 from the interstitial material.

Figure 9:
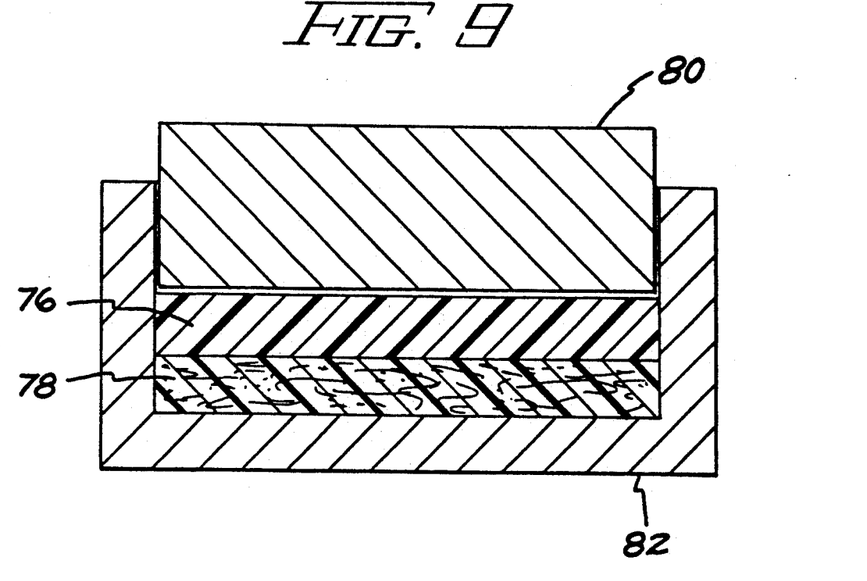
FIG. 9 is a side cross-sectional view of a mold for making a three-component expanded fiber composite structure.

Two additional processes, employing compression molding, for producing an expanded fiber composite structure wherein the voids are filled with an interstitial material will be described by referring to FIGS. 9 and 10. In FIG. 9, a layer of a neat fiber-free resin 76 is laid atop a sheet of the expanded fiber composite structure 78 between upper and lower mold halves 80 and 82. In the process of forming the three component composite structure, the mold is then used to supply heat and pressure to melt the resin layer 76, enabling the resin to flow into the interstitial voids of the plastic coated fiber composite structure 78. The material thus formed is then cooled to final product form.

Figure 10:
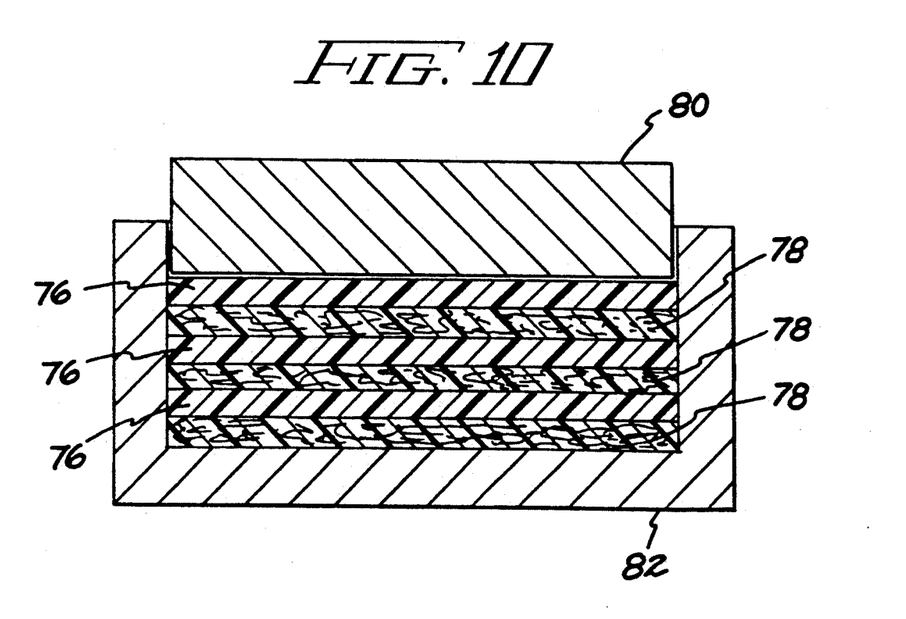
FIG. 10 is a side cross-sectional view of a mold which is charged for making a multi-layer three-component expanded fiber composite structure.

In FIG. 10, it can be seen that a similar process may be performed using multiple alternating layers of the plastic-reinforced fiber composite structure 78 and neat resins 76. Once the layers are assembled in the mold 80 and 82, heat and pressure are applied to melt the resin and drive the flowable resin into the interstitial voids of the composite structure 78.

Figure 11:
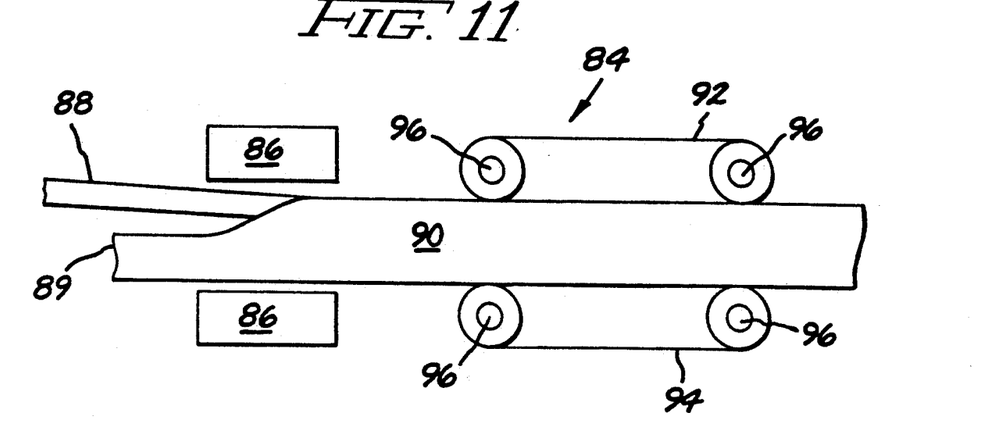
FIG. 11 is a diagrammatic view of an apparatus adapted to perform a process for making a three component expanded fiber composite structure using a substantially continuous impregnated fiber mat.

FIG. 11 depicts a diagrammatic representation of an apparatus 84 used to perform a process for continuous addition of interstitial materials. As shown, the process also incorporates the step of lofting the continuous mat at the same time the interstitial material is introduced. The process performed with this apparatus 84 begins with passing an unexpanded or unlofted plastic-impregnated fiber mat through a heating means depicted in block form in FIG. 11 as a pair of heaters 86. The heaters are preferably designed and positioned to heat the fiber mat and its surrounding plastic to a temperature at which the mat will loft, that being a temperature approaching the melting point of the particular plastic used as the fiber coating.

The process also includes passing a film of neat resin 88, which is an unfilled and unreinforced resin, between the heaters 86 and onto the expanding or expanded plastic-impregnated fiber mat 89. The temperature of the heaters 86 and the proximity with which the neat resin film 88 is passed by the heater are preferably sufficient to convert the resin into a flowable molten form, such that it will penetrate into the voids in the mat. It is to be noted that a crystalline polymer becomes "molten" at temperatures above a melting temperature for the particular material, and an amorphous polymer becomes "molten" at temperatures above a glass transition temperature of the particular material.

In a manner similar to the mat lofting process described with respect to FIG. 2, the three-component composite structure 90 in FIG. 11 is then passed between a pair of endless belts 92 and 94, driven by rollers 96, which are maintained at a predetermined spacing which is substantially equal to a desired thickness of the end product. The belts 92 and 94, are preferably of a length sufficient to allow cooling of the structure, such that upon exiting the belt area, the mat is not free to expand any further and the resin is no longer flowable.

Figure 12:
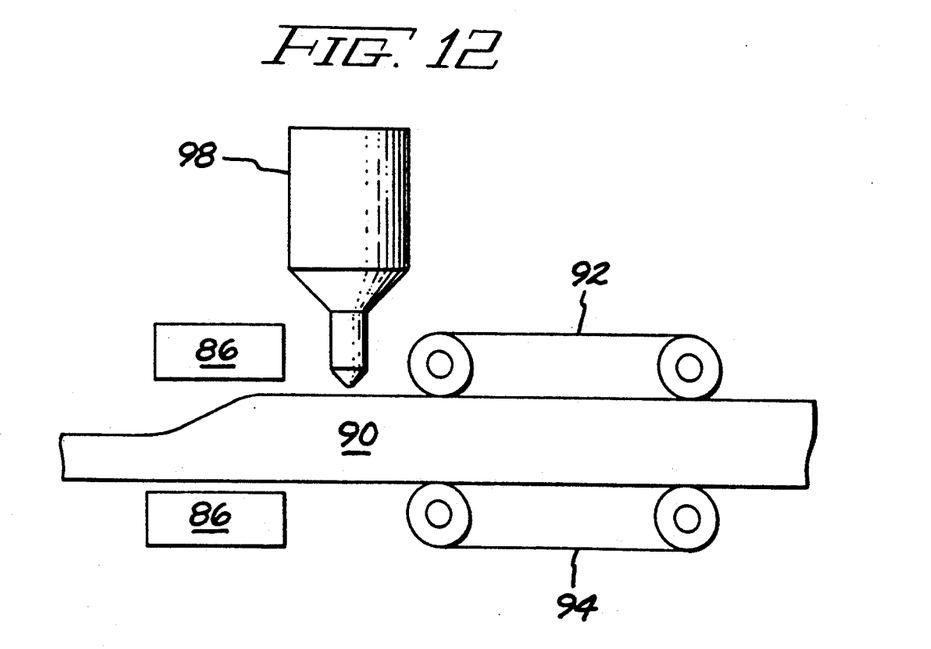
FIG. 12 is a diagrammatic view of an apparatus adapted to perform a process for making a three component expanded fiber composite structure using a substantially continuous impregnated fiber mat.

The process performed by the apparatus of FIG. 12 is similar in many respects to the process performed by the apparatus of FIG. 11. In this process, an extruder 98 is provided which is adapted to extrude a molten neat resin onto the composite structure in lieu of using resin film 88. The process for producing an expanded fiber composite sheet in FIG. 12 thus begins with passing an unlofted plastic impregnated fiber mat 89 through a heater 86 to heat the mat to a temperature sufficient to permit expansion of the mat. A molten neat resin is then extruded onto the mat, the molten resin flowing to fill interstitial voids in the expanded mat and forming a three component composite structure 90. The composite structure 90 is then passed through a pair of endless belts 92 and 94 spaced apart at a predetermined distance, the endless belts being adapted to retain the form of the structure while the structure is cooled.

The three component composite structures produced by any of the above-described processes may be used in applications where foamed structures would not provide adequate performance. In the previously mentioned cantilever and coiled spring applications, the interstitial voids of the expanded fiber structure could be filled with an elastomer or a semi-elastomer. One example of such a structure would advantageously comprise a mat of glass fibers, coated (by impregnation) with a polybutylene terephthalate (PBT) thermoplastic such as VALOX ®, which has a melting point of 450° F., and the interstitial material would comprise a semi-elastomeric copolymer of PBT and styrenebutadiene rubber (SBR) such as LOMOD ®. VALOX ® and LOMOD ® are registered trademarks of the General Electric Company.

Other advantageous combination of materials used for the fibers, impregnation material, and interstitial material are also envisioned. A high toughness, high strength composite structure would advantageously comprise a mat of glass fiber coated (impregnated) with a semi-elastomer like G.E.'s LOMOD ®, and filled interstitially with a polycarbonate, such as LEXAN ®, which has a glass transition temperature of 284° F., LEXAN ® being a registered trademark of the General Electric Company. A tough, insulative, and moisture resistant material might advantageously employ glass fibers coated with G.E.'s LEXAN ® for toughness, and filled interstitially with a foamed insulative material, such as polyurethane. This structure would also advantageously be provided with an outer coating of polyethylene, which would serve as a moisture barrier.

It is further envisioned that any of the embodiments of the expanded fiber composite structure of the present invention may also be provided with one or more outer layers of a monolithic or laminated sheet type material to provide desired cosmetic and barrier properties.

While the invention has been particularly shown and described with reference to several preferred embodiments of the composite structure and processes for producing such structures, it will be understood by those skilled in the art that various changes in form and detail may be made without departing from the true spirit and fully scope of the invention. The scope of the invention is therefore to be determined by reference to the appended claims.

What is claimed is:

1. A composite structure comprising:
   a fiber mat having front and rear faces and two side edges; and
   a polymeric material impregnant distributed substantially throughout said fiber mat wherein each fiber of said fiber mat is substantially completely coated by said polymeric material, said polymeric material forming a substantially monolithic structure holding said fiber mat in partial compression, at least one of said front and rear faces forming a non-porous surface and both of said side edges forming porous surfaces, said fiber mat being formed in a coiled, substantially cylindrical shape where said at least one face forms a non-porous outer cylindrical wall and each of said side edges forms a porous cylinder end.

2. A composite structure as defined in claim 1 wherein said fiber mat of said structure comprises a plurality of glass fibers and said polymeric material comprises a thermoplastic polymeric material.

3. A composite structure as defined in claim 2 wherein said porous cylinder ends are so constructed and arranged to be used as a filter media.

4. A composite structure as defined in claim 1 wherein said fiber mat comprises a plurality of conductive metal fibers.

* * * * *